United States Patent
Storey et al.

(10) Patent No.: US 9,739,539 B2
(45) Date of Patent: Aug. 22, 2017

(54) METHODS AND SYSTEMS FOR CONTROLLING TEMPERATURE IN A VESSEL

(71) Applicant: General Electric Company, Schenectady, NY (US)

(72) Inventors: James Michael Storey, Houston, TX (US); Alex Clinton Solomon, Atlanta, GA (US); Benjamin Campbell Steinhaus, Missouri City, TX (US); Judeth Brannon Corry, Manvel, TX (US); Steven Craig Russell, Houston, TX (US); Robert Henri Gauthier, Houston, TX (US); Yasir Hafeez Abbasi, Houston, TX (US); Lien-Yan Chen, Spring, TX (US)

(73) Assignee: General Electric Company, Schenectady, NY (US)

( * ) Notice: Subject to any disclaimer, the term of this patent is extended or adjusted under 35 U.S.C. 154(b) by 509 days.

(21) Appl. No.: 14/279,918

(22) Filed: May 16, 2014

(65) Prior Publication Data
US 2014/0246175 A1    Sep. 4, 2014

Related U.S. Application Data

(62) Division of application No. 11/970,943, filed on Jan. 8, 2008, now Pat. No. 8,752,615.

(51) Int. Cl.
F28D 7/00 (2006.01)
C10J 3/82 (2006.01)
(Continued)

(52) U.S. Cl.
CPC ............ F28D 7/0041 (2013.01); C10J 3/82 (2013.01); C10K 1/005 (2013.01); F01K 23/068 (2013.01);
(Continued)

(58) Field of Classification Search
CPC ............ F28D 7/0041; F28D 21/0003; F28D 2021/0075; C10J 3/82; C10J 3/86;
(Continued)

(56) References Cited

U.S. PATENT DOCUMENTS 1,951,990 A    3/1934   Noack
3,464,917 A    9/1969   Porteous
(Continued)

FOREIGN PATENT DOCUMENTS

CN    2863802 Y  *  1/2007
EP    0131099 A2    1/1985
(Continued)

OTHER PUBLICATIONS

CN 2863802 Y translation.*
PCT/US2008/085887, Search Report and Written Opinion, Jun. 30, 2010.

Primary Examiner — Davis Hwu
Assistant Examiner — Gordon Jones
(74) Attorney, Agent, or Firm — Armstrong Teasdale LLP (57) ABSTRACT

A system for preheating a pressure vessel includes a throat including an area of excess heat and a dome having an area of deficient heat. The throat includes a conduit extending from a pressure vessel opening to the pressure vessel interior. A plenum is defined between the throat and a seal within the dome. The throat extends from the dome toward a dome floor. The floor is substantially perpendicular to the throat. A conduit is coupled to the plenum and channels a flow of purge fluid into the plenum wherein heat from the throat is transferred to the flow of purge fluid and carried by the flow of purge fluid into the area of deficient heat via a gap defined between the seal and the floor such that the flow of purge fluid reduces temperature differential stresses within the pressure vessel and purges the area of deficient heat.

10 Claims, 7 Drawing Sheets

(51) Int. Cl.
  *F01K 23/06*  (2006.01)
  *F28D 21/00*  (2006.01)
  *F28F 9/02*  (2006.01)
  *C10K 1/00*  (2006.01)

(52) U.S. Cl.
  CPC ........ *F28D 21/0003* (2013.01); *F28F 9/0229* (2013.01); *C10J 2300/165* (2013.01); *C10J 2300/1675* (2013.01); *F28D 2021/0075* (2013.01); *Y02E 20/18* (2013.01)

(58) Field of Classification Search
  CPC ...... C10K 1/005; F01K 23/068; F28F 9/0229; Y02E 20/18
  See application file for complete search history.

(56) References Cited

U.S. PATENT DOCUMENTS

| | | | |
|---|---|---|---|
| 4,045,285 A | | 8/1977 | Baumgaertner et al. |
| 4,159,447 A | | 6/1979 | Danguillier et al. |
| 4,267,882 A | | 5/1981 | Gralton |
| 4,309,194 A | | 1/1982 | Salvador et al. |
| 4,377,394 A | | 3/1983 | Muenger et al. |
| 4,395,268 A | * | 7/1983 | Zabelka ............... C10J 3/86 122/235.12 |
| 4,513,694 A | * | 4/1985 | Wiemer ............... F22B 1/1846 122/235.12 |
| 4,535,727 A | * | 8/1985 | Ziegler ............... C10J 3/86 122/32 |
| 4,936,376 A | | 6/1990 | Martin et al. |
| 5,230,717 A | | 7/1993 | Ogawa et al. |
| 5,233,943 A | * | 8/1993 | Martin ............... C10J 3/86 122/504 |
| 5,513,599 A | * | 5/1996 | Nagato ............... C10J 3/463 122/4 D |
| 5,630,470 A | | 5/1997 | Lockwood, Jr. |
| 5,695,007 A | | 12/1997 | Fauconnier et al. |
| 5,713,312 A | * | 2/1998 | Waryasz ............... C10J 3/86 110/234 |
| 5,775,807 A | | 7/1998 | Dutcher |
| 6,599,011 B2 | | 7/2003 | Daily et al. |
| 6,613,127 B1 | * | 9/2003 | Galloway ............... F28C 3/06 261/104 |
| 7,125,913 B2 | | 10/2006 | Pan et al. |
| 2007/0095046 A1 | | 5/2007 | Wallace et al. |
| 2008/0000155 A1 | | 1/2008 | Van Den Berg et al. |
| 2008/0042373 A1 | | 2/2008 | Wilson et al. |
| 2008/0175770 A1 | * | 7/2008 | Wallace ............... C10J 3/485 422/201 |

FOREIGN PATENT DOCUMENTS

| | | |
|---|---|---|
| EP | 0348850 A1 | 1/1990 |
| GB | 1549736 A | 8/1979 |
| WO | 2007055930 A2 | 5/2007 |

* cited by examiner

METHODS AND SYSTEMS FOR CONTROLLING TEMPERATURE IN A VESSEL

CROSS REFERENCE TO RELATED APPLICATIONS

This application is a divisional and claims priority to U.S. patent application Ser. No. 11/970,943 filed Jan. 8, 2008 for "METHODS AND SYSTEMS FOR CONTROLLING TEMPERATURE IN A VESSEL," which is hereby incorporated by reference herein in its entirety.

BACKGROUND

This invention relates generally to process systems, and more specifically to methods and systems for improving operation of pressure vessels used in gasification systems.

At least some known vessels include an annular space located near a vertically upper hemispherical head of the vessel. The annular space may be used to consolidate piping ends into headers that channel the flow of fluid in the pipes to and from external to the vessel. Such piping may result in complex pipe routing that reduces a capability to effectively maintain the vessel. Specifically, a refractory lined throat that carries hot fluid into the vessel from, for example, a gasifier may be difficult to maintain because of the piping located in the head.

Additionally, the hot fluid may leak into the annular space from inside the throat. The leaking fluid may include corrosive gases that over time may shorten the life of components in the head.

Furthermore, various materials and various thicknesses of the materials may be used in the fabrication of the vessel, head, and/or components within the vessel and head. Because such materials and materials may expand and contract at different rates when exposed to changing temperatures within the vessel. Thermal stresses may be generated that exceed the strength and/or the cycle fatigue rating of the vessel, head, and/or components.

SUMMARY

In one embodiment, a system for preheating a vessel includes a pressure vessel having a throat including an area of excess heat and a dome adjacent to the throat including an area of deficient heat. The throat includes a conduit extending from a pressure vessel opening to a pressure vessel interior. The system includes a plenum defined between the throat and a seal enclosed within the dome. The throat extends from the dome proximate to the pressure vessel opening toward a floor of the dome. The floor is erected substantially perpendicular to the throat. The system includes a conduit coupled to the plenum. The conduit is for channeling flow of purge fluid from external to the pressure vessel into the plenum. Heat from the area of excess heat is transferred to the flow of purge fluid in the plenum. The heat is carried by the flow of purge fluid into the area of deficient heat via a gap defined between the seal and the floor such that the flow of purge fluid facilitates reducing temperature differential stresses within the dome and the pressure vessel, and purges the area of deficient heat.

DETAILED DESCRIPTION OF THE INVENTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, systems and methods for preheating and purging a pressure vessel space. However, it is contemplated that this disclosure has general application to controlling temperature in commercial and industrial spaces.

Figure 1:
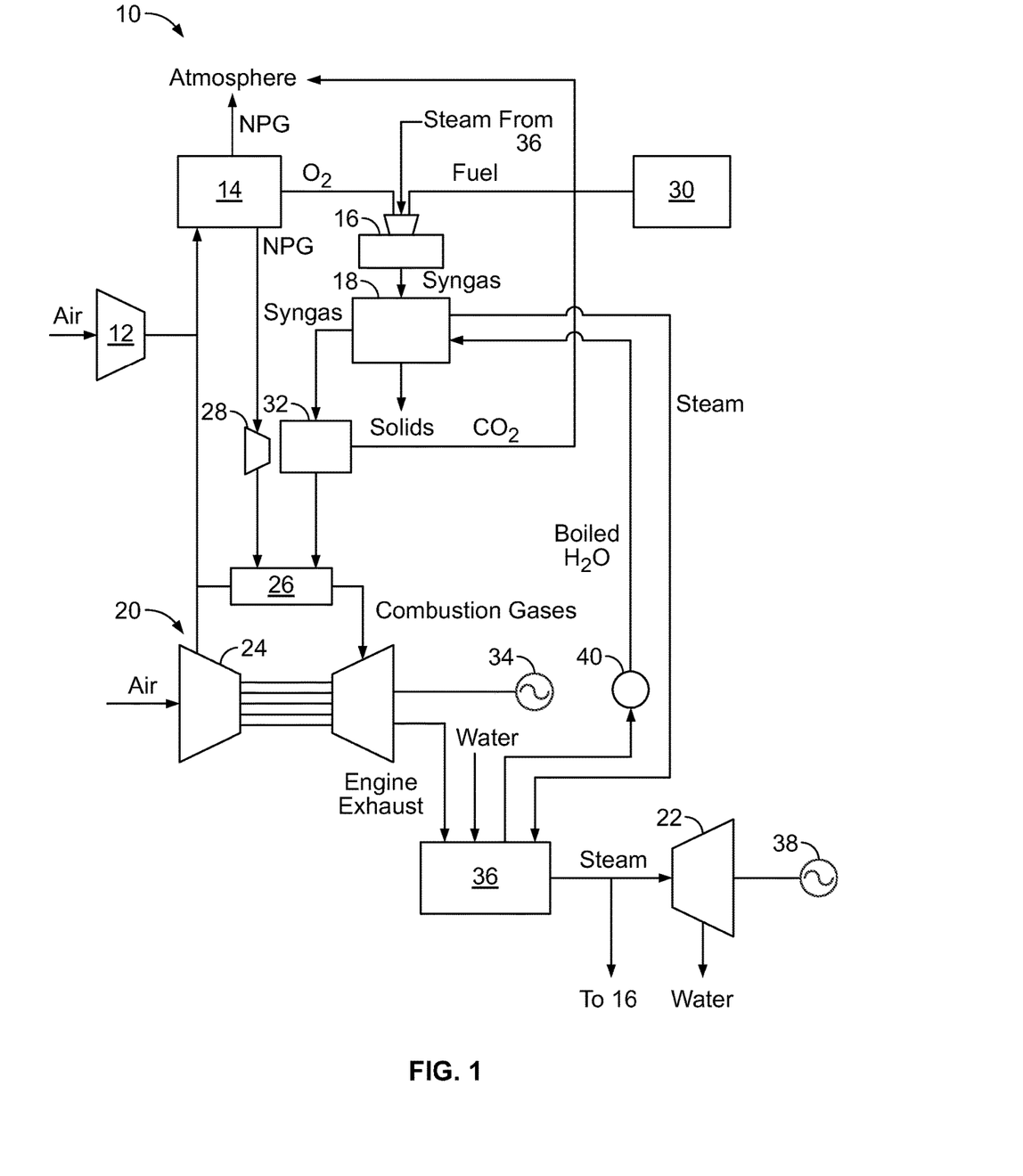
FIG. 1 is a schematic diagram of an exemplary integrated gasification combined-cycle (IGCC) power generation system in accordance with an embodiment of the present invention.

FIG. 1 is a schematic diagram of an exemplary integrated gasification combined-cycle (IGCC) power generation system 10 in accordance with an embodiment of the present invention. In the exemplary embodiment, IGCC system 10 includes a main air compressor 12, an air separation unit (ASU) 14 coupled in flow communication to compressor 12, a gasifier 16 coupled in flow communication to ASU 14, a syngas cooler 18 coupled in flow communication to gasifier 16, a gas turbine engine 20 coupled in flow communication to syngas cooler 18, and a steam turbine 22 coupled in flow communication to syngas cooler 18.

In operation, compressor 12 compresses ambient air that is then channeled to ASU 14. In the exemplary embodiment, in addition to compressed air from compressor 12, compressed air from a gas turbine engine compressor 24 is supplied to ASU 14. Alternatively, compressed air from gas turbine engine compressor 24 is supplied to ASU 14, rather than compressed air from compressor 12 being supplied to ASU 14. In the exemplary embodiment, ASU 14 uses the compressed air to generate oxygen for use by gasifier 16. More specifically, ASU 14 separates the compressed air into separate flows of oxygen (O2) and a gas by-product, sometimes referred to as a "process gas." The $O_2$ flow is channeled to gasifier 16 for use in generating partially oxidized gases, referred to herein as "syngas" for use by gas turbine engine 20 as fuel, as described below in more detail.

The process gas generated by ASU 14 includes nitrogen and will be referred to herein as "nitrogen process gas" (NPG). The NPG may also include other gases such as, but not limited to, oxygen and/or argon. For example, in the exemplary embodiment, the NPG includes between about 95% and about 100% nitrogen. In the exemplary embodiment, at least some of the NPG flow is vented to the atmosphere from ASU 14, and at some of the NPG flow is injected into a combustion zone (not shown) within a gas turbine engine combustor 26 to facilitate controlling emissions of engine 20, and more specifically to facilitate reducing the combustion temperature and reducing nitrous oxide emissions from engine 20. In the exemplary embodiment, IGCC system 10 includes a compressor 28 for compressing the nitrogen process gas flow before being injected into the combustion zone of gas turbine engine combustor 26.

In the exemplary embodiment, gasifier 16 converts a mixture of fuel supplied from a fuel supply 30, $O_2$ supplied by ASU 14, steam, and/or limestone into an output of syngas for use by gas turbine engine 20 as fuel. Although gasifier 16 may use any fuel, gasifier 16, in the exemplary embodiment, uses coal, petroleum coke, residual oil, oil emulsions, tar sands, and/or other similar fuels. Furthermore, in the exemplary embodiment, the syngas generated by gasifier 16 includes carbon dioxide.

In the exemplary embodiment, syngas generated by gasifier 16 is channeled to syngas cooler 18 to facilitate cooling the syngas, as described in more detail below. The cooled syngas is channeled from cooler 18 to a clean-up device 32 for cleaning the syngas before it is channeled to gas turbine engine combustor 26 for combustion thereof. Carbon dioxide (CO2) may be separated from the syngas during clean-up and, in the exemplary embodiment, may be vented to the atmosphere. Gas turbine engine 20 drives a generator 34 that supplies electrical power to a power grid (not shown). Exhaust gases from gas turbine engine 20 are channeled to a heat recovery steam generator 36 that generates steam for driving steam turbine 22. Power generated by steam turbine 22 drives an electrical generator 38 that provides electrical power to the power grid. In the exemplary embodiment, steam from heat recovery steam generator 36 is supplied to gasifier 16 for generating syngas.

Furthermore, in the exemplary embodiment, system 10 includes a pump 40 that supplies boiled water from steam generator 36 to syngas cooler 18 to facilitate cooling the syngas channeled from gasifier 16. The boiled water is channeled through syngas cooler 18 wherein the water is converted to steam. The steam from cooler 18 is then returned to steam generator 36 for use within gasifier 16, syngas cooler 18, and/or steam turbine 22.

Figure 2:
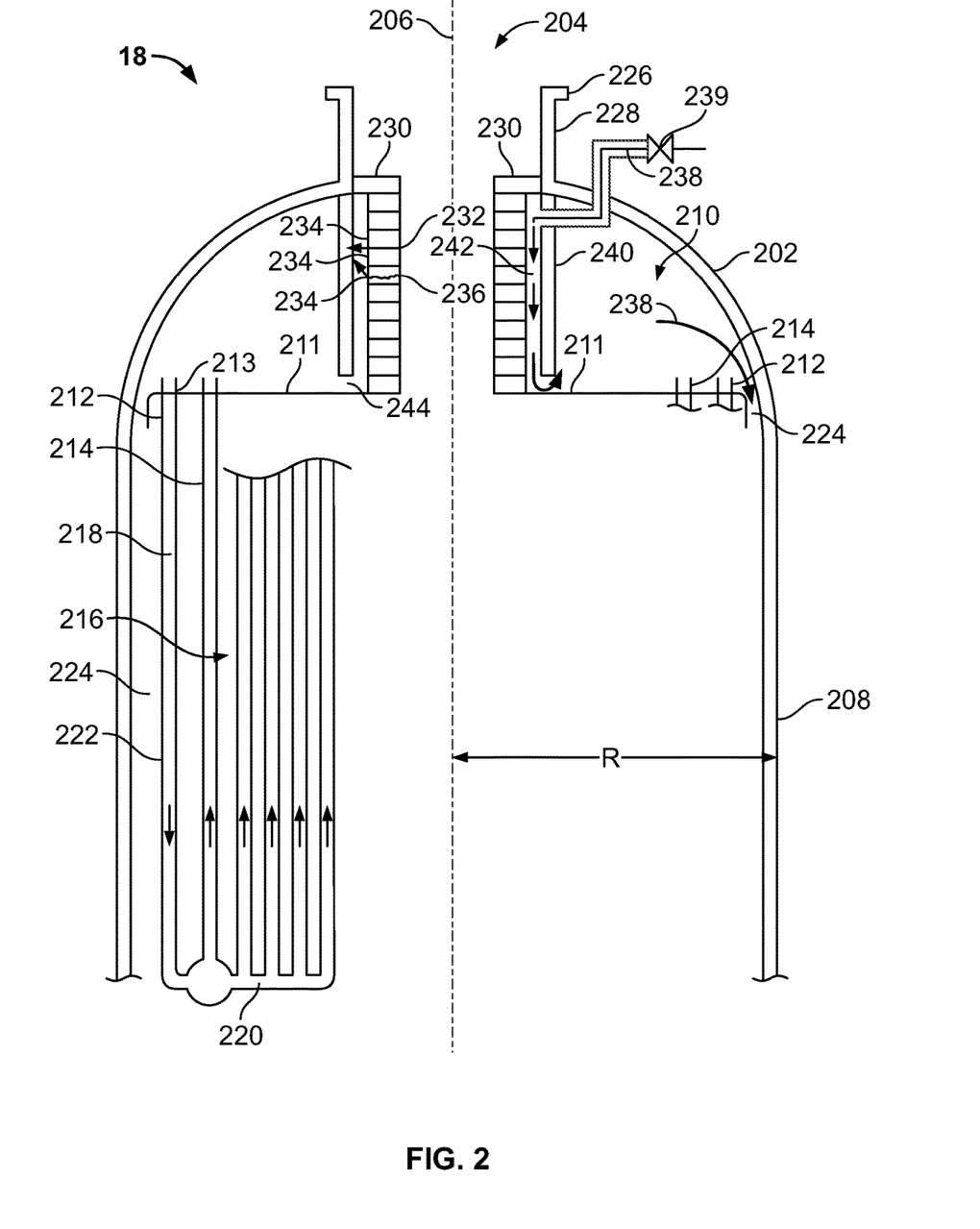
FIG. 2 shows a schematic cross-sectional view of the syngas cooler shown in FIG. 1.

FIG. 2 shows a schematic cross-sectional view of syngas cooler 18 (shown in FIG. 1). In the exemplary embodiment, syngas cooler 18 is a radiant syngas cooler. Syngas cooler 18 includes a pressure vessel shell 202 having a top opening 204 and a bottom opening (not shown) that are generally concentrically aligned with each other along a centerline 206 of syngas cooler 18. As referred to herein, an "axial" direction is a direction that is substantially parallel to centerline 206, an "upward" direction is a direction that is generally towards top opening 204, and a "downward" direction is a direction that is generally towards the bottom opening. Syngas cooler 18 includes a radius R measured from centerline 206 to an outer surface 208 of shell 202. Furthermore, in the exemplary embodiment, a dome 210 of cooler 18 includes dome floor 211 that includes a plurality of downcomer openings 213 and a plurality of riser openings (not shown) that circumscribe the top opening. In the exemplary embodiment, shell 202 is fabricated from a pressure vessel quality steel, such as, but not limited to, a chromium molybdenum steel. As such, shell 202 is facilitated to withstand the operating pressures of syngas flowing through syngas cooler 18. Moreover, in the exemplary embodiment, the shell top opening is coupled in flow communication with gasifier 16 for receiving syngas discharged from gasifier 16. The bottom opening of shell 202, in the exemplary embodiment, is coupled in flow communication with a slag collection unit (not shown) to enable the collection of solid particles formed during gasification and/or cooling.

Within shell 202, in the exemplary embodiment, are a plurality of heat transfer medium supply lines (also referred to herein as "downcomers") 212, a heat transfer wall (also referred to herein as a "tube wall") 214, and a plurality of heat transfer panels (also referred to herein as "platens") 216. More specifically, in the exemplary embodiment, downcomers 212 are positioned radially inward of shell 202, tube wall 214 is radially inward of downcomers 212, and platens 216 are arranged within tube wall 214 such that tube wall 214 substantially circumscribes platens 216.

In the exemplary embodiment, downcomers 212 supply a heat transfer medium 218, such as, for example, water from steam generator 36, to syngas cooler 18, as described herein. Downcomers 212 supply heat transfer medium 218 to tube wall 214 and platens 216 via a lower manifold 220. Lower manifold 220, in the exemplary embodiment, is coupled proximate to the cooler bottom opening, and, as such, is downstream from cooler top opening 204 through which syngas enters cooler 18. In the exemplary embodiment, downcomers 212 include tubes 222 fabricated from a material that enables cooler 18 and/or system 10 to function as described herein. Furthermore, in the exemplary embodiment, a gap 224 defined between shell 202 and tube wall 214 may be pressurized to facilitate decreasing stresses induced to tube wall 214.

Shell 202 includes a flange 226 that may be used to couple cooler 18 to gasifier 16 (shown in FIG. 1) a throat 228 extends vertically upward from shell 202 to flange 226. A refractory lining 230 extends throat 228 from shell 202 to dome floor 211. Syngas received from gasifier 16 passes through throat 228 and refractory lining 230. Accordingly, throat 228 and refractory lining 230 are subject to the high temperature of the syngas flow. In an alternative embodiment, refractory lining 230 extends vertically upward and radially inwardly from throat 228. In the exemplary embodiment, refractory lining 230 comprises a plurality of stackable bricks of refractory material. In an alternative embodiment, refractory lining comprises a castable refractory material formed to fit through opening 204.

During operation, a portion of the syngas flowing through throat 228 may pass through a gap 232 between individual bricks 234 of refractory lining 230 or may pass through a crack 236 that may develop in a brick 234 or in the castable refractory 230. The syngas leaking from throat 228 into dome 210 may cause corrosion or high temperature degradation of shell 202 or components (not shown for clarity) located within dome 210. In the exemplary embodiment, dome 210 may be purged and/or pressurized by a flow of gas 238, such as nitrogen. Gas flow 238 may be supplied at a temperature that is much lower than the components within dome 210 or shell 202. Such a temperature differential may cause temperature stress on components or shell 202 that are exposed to flow 238. To preheat flow 238 without using valuable heat from other portions of system 10, a skirt 240 may be used to circumscribe throat 228. Flow 238 may be supplied to an annulus 242 formed between refractory lining 230 and skirt 240. Skirt 240 extends from shell 202 proximate opening 204 vertically downward towards dome floor 211. A gap 244 permits flow 238 to escape annulus 242 and enter dome 210. As flow 238 passes refractory lining 230, flow 238 absorbs heat transmitted through refractory lining 230 from the high temperature syngas flowing through throat 228. The heat absorbed by flow 238 increases the temperature of flow 238 so that upon entry into dome 210 flow 238 is at a temperature that facilitates reducing temperature differential stresses in the dome components and shell 202. Flow 238 exits dome 210 through gap 224. In the exemplary embodiment, flow 238 is controlled by a valve 239 that may be set manually based on a predetermined flow rate or may be modulated by a control system (not shown).

Figure 3:
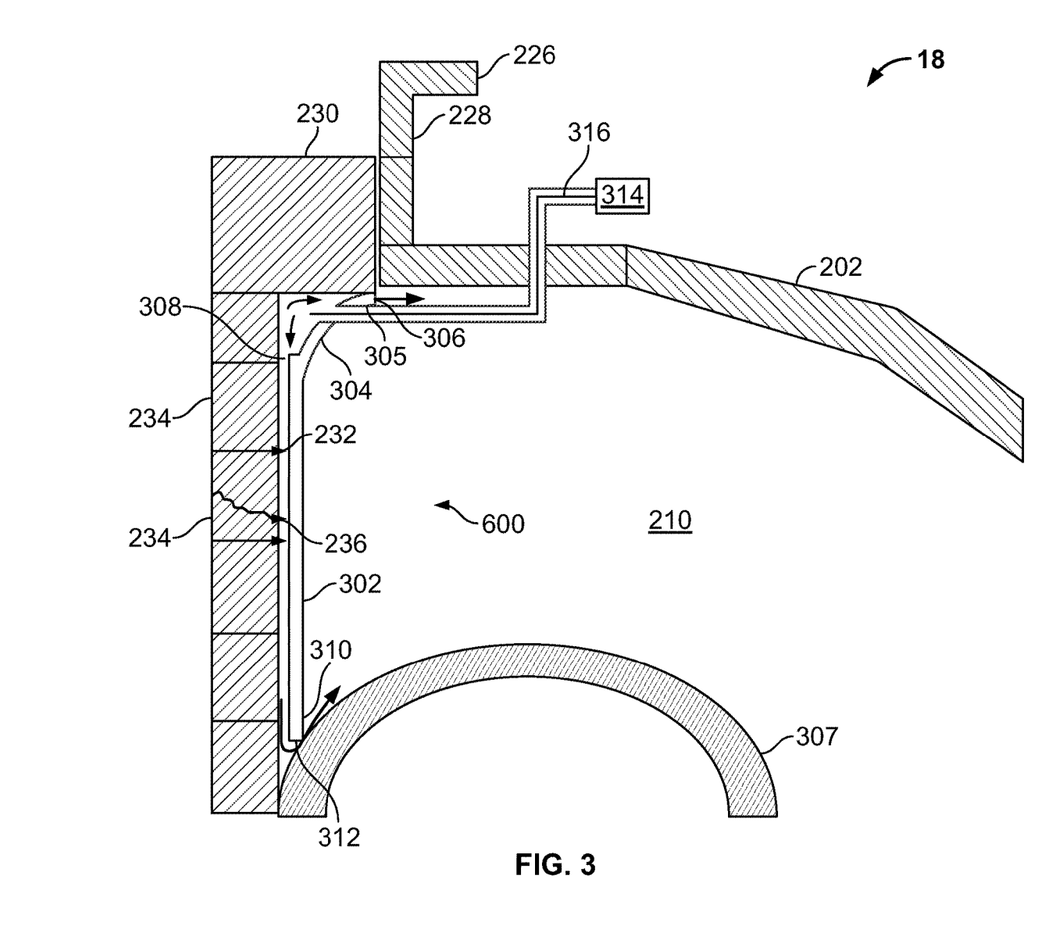
FIG. 3 is an elevation view of a portion of the syngas cooler in accordance with still yet another embodiment of the present invention.

FIG. 3 is an elevation view of a portion of syngas cooler 18 in accordance with another embodiment of the present invention. In the exemplary embodiment, a throat seal 300 comprises a cylinder 302 circumscribing refractory lining 230. Throat seal 300 also includes a curved crown 304 that is concave toward dome 210 to accept thermal expansion displacement. Crown 304 may be welded to cylinder 302 to provide a seal therebetween. A top edge 305 of crown 304 may be welded or otherwise coupled to shell 202 or may be frictionally engaged to a portion of refractory lining 230 to provide a seal or may be configured with a gap 306 to permit a predetermined flow of cooling medium to escape from an annulus 308 formed between refractory lining 230 and cylinder 302. A bottom edge 310 of cylinder 302 may be coupled to upper an waterwall 307 to provide support and sealing between dome 210 and annulus 308. Specifically, cylinder 302 may be welded to upper waterwall 307 continuously about the circumference of bottom edge 310 or may be welded intermittently such that a gap 312 is formed between bottom edge 310 and upper waterwall 307. Gap 312 and/or gap 306 may be sized to permit a predetermined flow of cooling medium to cool refractory lining 230 while preheating the cooling medium to facilitate reducing temperature related fatigue and/or corrosion within dome 210. A supply of cooling medium for example, but not limited to nitrogen, may be provided from a source 314 external to cooler 18 through a conduit 316 that penetrates shell 202 and seal 300 and channels the flow of cooling medium into annulus 308.

Figure 4:
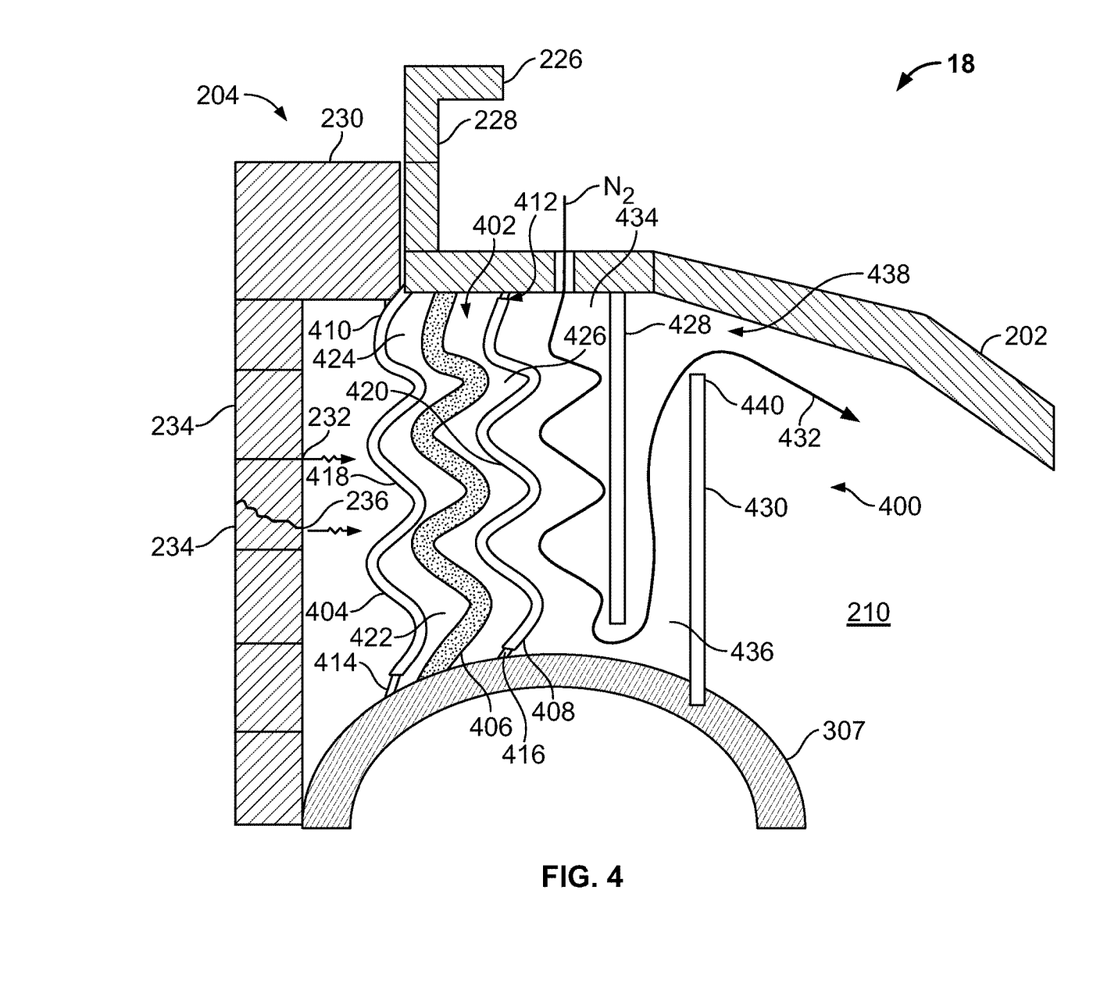
FIG. 4 is an elevation view of a portion of the syngas cooler in accordance with a further embodiment of the present invention.

FIG. 4 is an elevation view of a portion of syngas cooler 18 in accordance with another embodiment of the present invention. In the exemplary embodiment, a throat seal 400 comprises a flexible bellows 402 that includes a radially inner portion 404, an insulation portion 406, and a radially outer portion 408 that circumscribe refractory lining 230. Inner portion 404 and outer portion 408 each include an upper edge 410 and 412, a lower edge 414 and 416, and a corrugated body 418 and 420 extending therebetween. In the exemplary embodiment, upper edges 410 and 412 are coupled by welding to shell 202 and lower edges 414 and 416 are coupled by welding to upper waterwall 307. In an alternative embodiment, edges 410 and 412 are welded to rings (not shown) to form a seal sub-assembly to facilitate installation and removal wherein the sub-assembly is bolted to shell 202 and upper water wall 307 using for example, flange seals. Insulation portion 406 may substantially fill a void 422 or may be thin enough to define a gap 424 between inner portion 404 and insulation portion 406 and/or a gap 426 between insulation portion 406 and outer portion 408. In an alternative embodiment, throat seal 400 may comprise additional layers of alternating corrugated bellows portions and insulation portions. Additionally, a plurality of bellows portions and/or insulation portions may be spaced adjacently. Throat seal 400 further includes an upper drum 428 that circumscribes flexible bellows 402 and extends downward from shell 202. Throat seal 400 also includes a lower drum 430 that extends upwardly from upper waterwall 307 and circumscribes upper drum 428 to facilitate channeling a flow of cooling medium 432 through a tortuous path that provides a predetermined residence time proximate flexible bellows 402. During operation, flow of cooling medium 432 is channel through a first passage 434 defined between flexible bellows 402 and upper drum 428 and through a second passage 436 defined between upper drum 428 and lower drum 430. Flow of cooling medium 432 exits second passage 436 through gap 438 defined between shell 202 and an upper edge 440 of lower drum 430.

The layered configuration described herein provides for a stepped temperature gradient, wherein the temperature proximate flexible bellows 402 both stays above the dewpoint of the syngas and heats the nitrogen for the annular purge of dome 210. A first layer allows for heat to flow of cooling medium 432 while keeping radially inner portion 404 hot. The second layer provides for heating flow of cooling medium 432 wherein the relatively cold metal proximate the second layer is not exposed to syngas. The final layer is used to inject heated flow of cooling medium 432 into dome 210.

Figure 5:
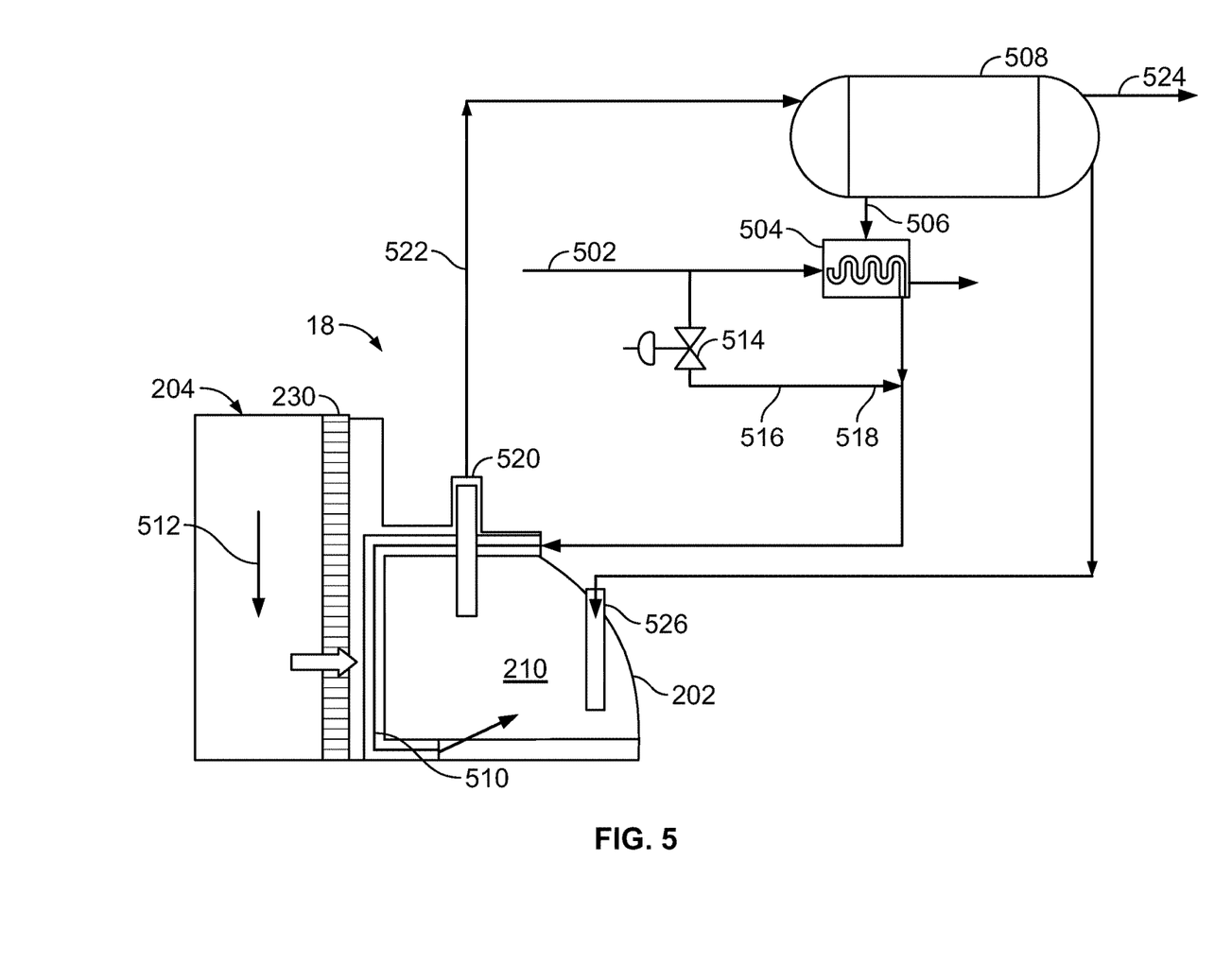
FIG. 5 is a schematic diagram of an exemplary dome purge preheating system that may be used with the gasifier shown in FIG. 1.

FIG. 5 is a schematic diagram of an exemplary dome purge preheating system 500 that may be used with gasifier 16 (shown in FIG. 1). During a warm-up of system 10, syngas cooler 18 may be preheated by circulating steam from an auxiliary source. A steam/water mixture flowing through the platens, warms the platen tubes and other components within syngas cooler 18 by radiation, conduction, and convection. However, the vessel shell temperature lags in comparison to the steam tubes. This temperature differential creates a thermal stress at the interface of the syngas cooler tubes and the vessel shell.

Additionally, nitrogen injection at elevated pressure of approximately 655 psig is used for syngas cooler 18 during operation. High pressure nitrogen is supplied by the air separation unit (ASU) in the gasification plant at a relatively low temperature of approximately 100° F. However, the metal surfaces inside the syngas cooler are at a relatively higher temperature for example, approximately 700-1200° F. during operation. If relatively cold nitrogen is injected into syngas cooler 18 at a temperature much lower than the metal surfaces on the interior of the vessel shell, life-limiting thermal stress may occur.

Dome purge preheating system 500 provides an additional heat source to warm the internals of syngas cooler 18 and reduces the temperature differential between the syngas cooler tubes and vessel shell during the warm-up process and to preheat purge nitrogen injected into dome 210 during operation.

In the exemplary embodiment, dome purge preheating system 500 includes a flow of cooling medium 502, typically nitrogen supplied from ASU 14, however in an alternative embodiment, flow of cooling medium 502 may be supplied from any convenient source having a capacity to fulfill the functions described herein. During warm-up, flow of cooling medium 502 is channeled through heat exchanger 504 where it receives heat from blowdown water 506 or other continuous heated water source from a main steam drum 508 associated with steam generator 36. Flow of cooling medium 502 is further channeled to a plenum 510 in heat transfer communication with refractory lining 230. Flow of cooling medium 502 is discharged into dome 210, having been warmed by blowdown water 506 or other continuous heated water source, to add heat to dome 210 to facilitate the warm-up process. During operation, a flow of syngas 512 from gasifier 16 passes refractory lining 230 giving up some of its heat, which is then conducted to plenum 510 and some of the heat is transferred to flow of cooling medium 502. Warmed cooling medium 502 is discharged into dome 210 to facilitate purging and warming of dome 210. A portion of the flow of cooling medium 502 may be bypassed using a bypass valve 514 positioned in a bypass line 516. A flow of bypass cooling medium 518 is modulated to facilitate controlling a temperature of the flow of cooling medium 502 so that a precise cooling medium 502 temperature is maintained. At least some heat provided to the blowdown water 506 is received from syngas cooler 18 through a riser 520 that penetrates shell 202 and a conduit 522 that channels a steam/water mixture to drum 508. The water and steam are separated in drum 508 wherein the steam exits drum 508 through a main steam header 524 and the water exits drum 508 and returns to syngas cooler 508 through downcomer penetration 526 that penetrates shell 202.

Figure 6:
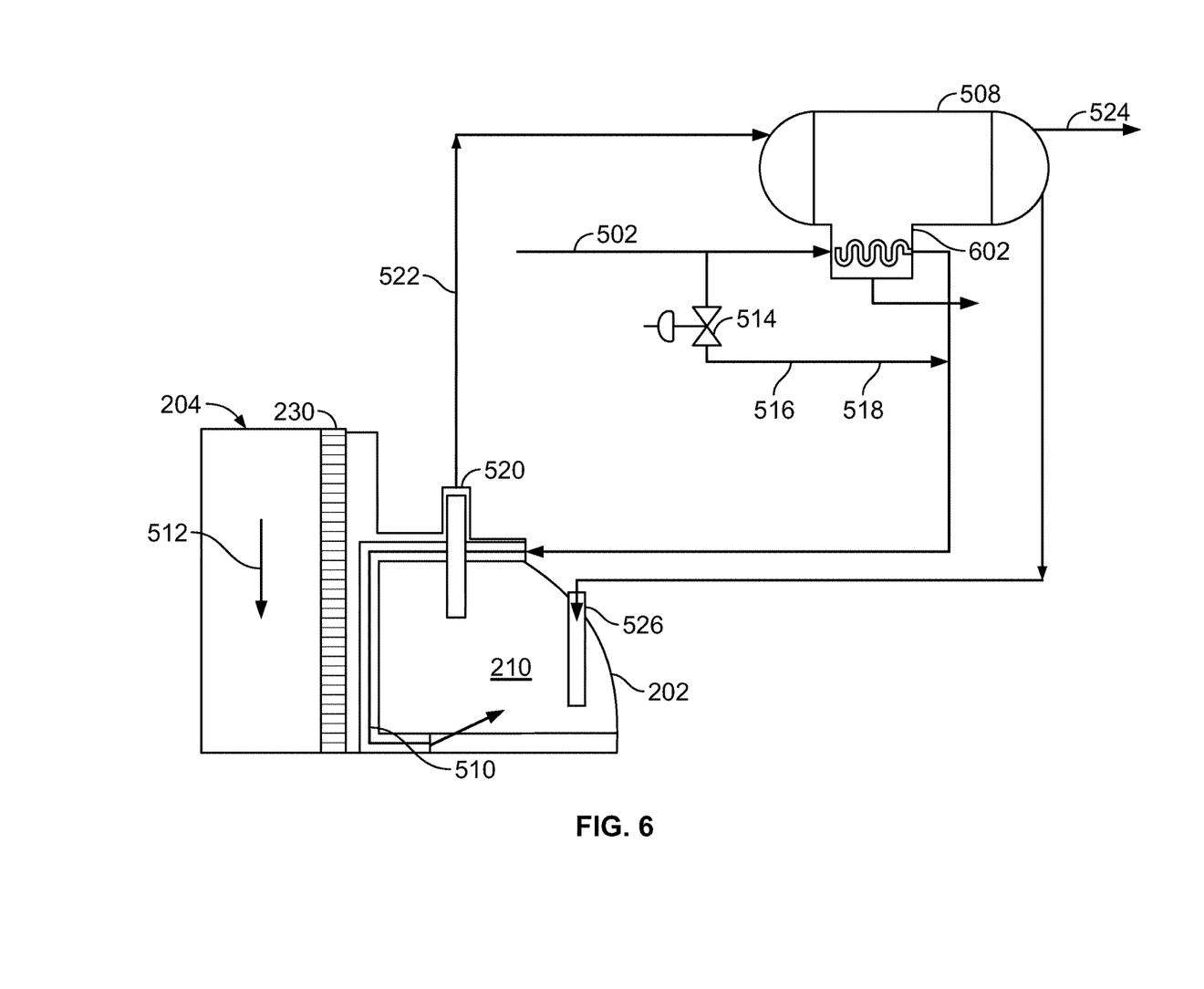
FIG. 6 is a schematic diagram of another exemplary dome purge preheating system that may be used with the gasifier shown in FIG. 1.

FIG. 6 is a schematic diagram of another exemplary dome purge preheating system 600 that may be used with gasifier 18 (shown in FIG. 1). In the exemplary embodiment, heat for preheating flow of cooling medium 502 is received from a drum blowdown sump 602.

Figure 7:
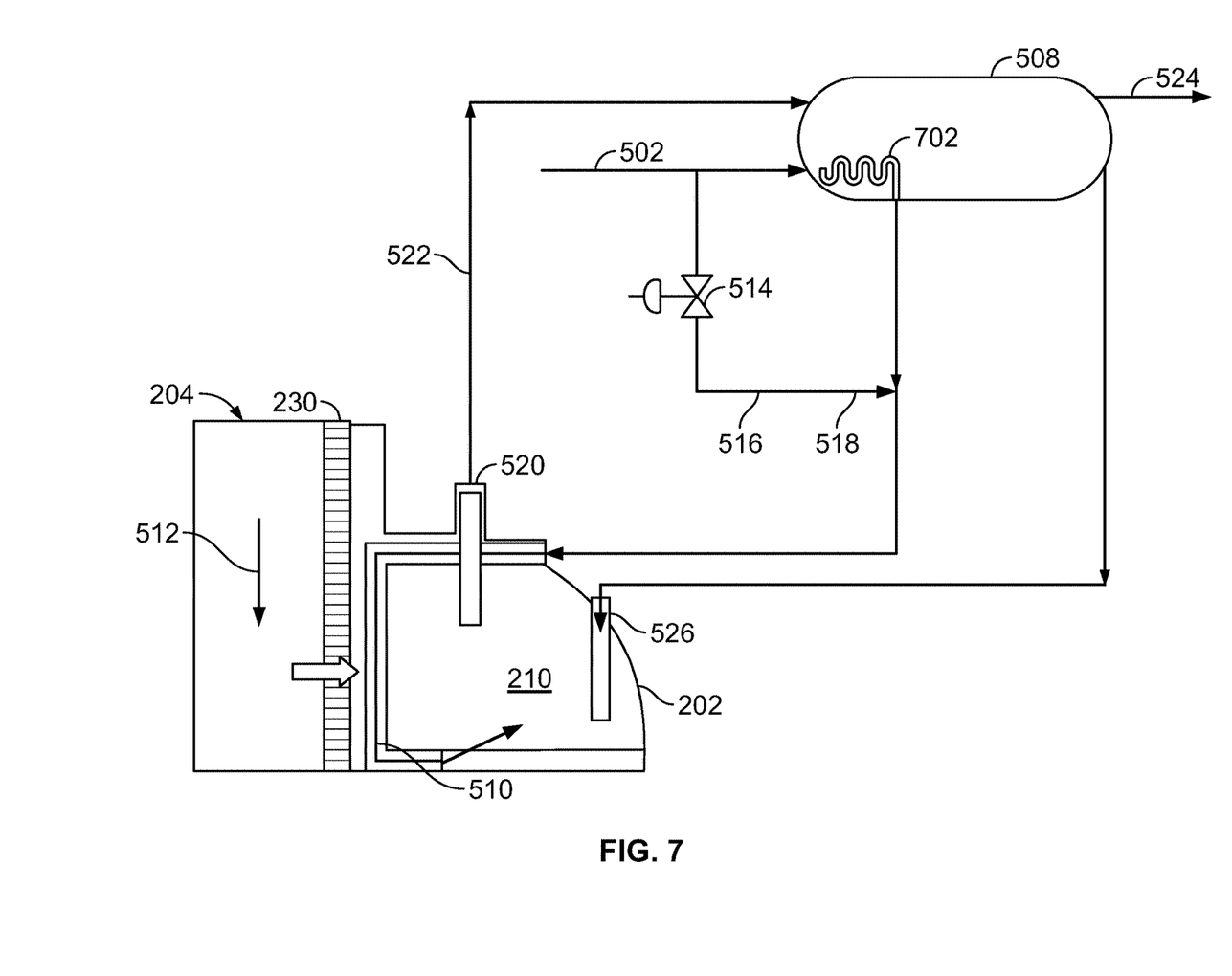
FIG. 7 is a schematic diagram of yet another exemplary dome purge preheating system that may be used with the gasifier shown in FIG. 1.

FIG. 7 is a schematic diagram of another exemplary dome purge preheating system 700 that may be used with gasifier 18 (shown in FIG. 1). In the exemplary embodiment, heat for preheating flow of cooling medium 502 is received from a heat exchanger coil 702 positioned within drum 508.

Exemplary embodiments of systems and methods for preheating and purging a pressure vessel space are described above in detail. The systems and methods illustrated are not limited to the specific embodiments described herein, but rather, components of the system may be utilized independently and separately from other components described herein. Further, steps described in the method may be utilized independently and separately from other steps described herein.

While embodiments of the disclosure have been described in terms of various specific embodiments, it will be recognized that the embodiments of the disclosure can be practiced with modification within the spirit and scope of the claims.

What is claimed is:

1. A system for preheating a vessel comprising:
a pressure vessel comprising a throat comprising an area of excess heat and a dome adjacent to said throat comprising an area of deficient heat, said throat defining a channel extending from a pressure vessel opening to the pressure vessel interior;
a plenum enclosed within said dome and defined between said throat and a seal circumscribing said throat, said throat extending from said dome proximate to said pressure vessel opening toward a floor of said dome, said floor erected substantially perpendicular to said throat; and
a conduit coupled to said plenum for channeling a flow of purge fluid from external to said pressure vessel into said plenum, wherein heat from the area of excess heat is transferred to the flow of purge fluid in said plenum and the heat is carried by the flow of purge fluid into the area of deficient heat via a gap defined between said seal and said floor such that the flow of purge fluid facilitates reducing temperature differential stresses within said dome and said pressure vessel, and purges the area of deficient heat.

2. A system in accordance with claim 1 wherein said throat comprises a flange configured to couple to a gasifier, said throat configured to channel products of partial oxidation into said pressure vessel.

3. A system in accordance with claim 1 wherein said throat comprises a refractory based lining.

4. A system in accordance with claim 1 wherein said seal comprises a skirt that circumscribes said throat.

5. A system in accordance with claim 1 further comprising a supplemental heat exchanger comprising a first flow path coupled in flow communication with said plenum, said supplemental heat exchanger configured to add supplemental heat to the flow of purge fluid.

6. A system in accordance with claim 5 further comprising a source of supplemental heat, wherein said supplemental heat exchanger further comprises a second flow path in thermal communication with said first flow path, said second flow path coupled in flow communication with said source of supplemental heat, said supplemental heat exchanger configured to add supplemental heat to the flow of purge fluid from said source of supplemental heat.

7. A system in accordance with claim 6 wherein said source of supplemental heat comprises a steam drum.

8. A system in accordance with claim 1 further comprising a control valve configured to modulate the flow of purge fluid through said conduit.

9. A system in accordance with claim 8 wherein said dome defines a first compartment of said pressure vessel, said floor separating said first compartment from a second compartment of said pressure vessel defined within a tube wall spaced radially inward from an outer shell of said pressure vessel.

10. A system in accordance with claim 1 wherein heat from the area of excess heat is transferred to the flow of purge fluid in said plenum and the heat is carried by the flow of purge fluid into the area of deficient heat such that the flow of purge fluid simultaneously purges the area of deficient heat.

* * * * *